(12) United States Patent
Chen et al.

(10) Patent No.: US 7,042,456 B2
(45) Date of Patent: May 9, 2006

(54) MODELING AND RENDERING OF REALISTIC FEATHERS

(75) Inventors: Yanyun Chen, Beijing (CN); Baining Guo, Beijing (CN); Ying-Qing Xu, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 10/623,425

(22) Filed: Jul. 18, 2003

(65) Prior Publication Data

US 2005/0012746 A1    Jan. 20, 2005

(51) Int. Cl.
*G09G 5/00* (2006.01)
*G06F 15/167* (2006.01)

(52) U.S. Cl. .................. 345/441; 345/442; 345/582
(58) Field of Classification Search ........ 345/418–421, 345/426, 428, 581–587, 441–443, 473
See application file for complete search history.

(56) References Cited

U.S. PATENT DOCUMENTS

| 4,418,103 | A | * | 11/1983 | Tani et al. ..................... 428/4 |
| 5,267,154 | A | | 11/1993 | Takeuchi et al. ............. 345/473 |
| 5,404,426 | A | | 4/1995 | Usami et al. ................ 345/420 |
| 5,758,046 | A | | 5/1998 | Rouet et al. ................. 345/419 |
| 5,912,675 | A | | 6/1999 | Laperriere ................... 345/473 |
| 6,097,396 | A | | 8/2000 | Rouet et al. ................. 345/582 |
| 6,317,130 | B1 | | 11/2001 | Ishikawa et al. ............. 345/473 |
| 6,351,266 | B1 | | 2/2002 | Kobayashi et al. .......... 345/442 |
| 6,400,368 | B1 | | 6/2002 | Laperriere ................... 345/473 |
| 6,414,684 | B1 | | 7/2002 | Mochizuki et al. .......... 345/473 |
| 6,559,849 | B1 | | 5/2003 | Anderson et al. ............ 345/474 |
| 6,720,962 | B1 | | 4/2004 | Alter ........................... 345/420 |
| 6,798,415 | B1 | | 9/2004 | Lake et al. .................. 345/474 |
| 2001/0019333 | A1 | | 9/2001 | Sasaki .......................... 345/653 |
| 2002/0057278 | A1 | | 5/2002 | Bruderlin .................... 345/582 |
| 2002/0196258 | A1 | | 12/2002 | Lake et al. .................. 345/474 |
| 2003/0179203 | A1 | * | 9/2003 | Bruderlin et al. ........... 345/473 |

OTHER PUBLICATIONS

Greg Turk, "Re-tiling polygonal surface", Computer Graphics (Proceedings of SIGGRAPH 92), 26(2) :55-64, Jul. 1992.
Tong et al., "Synthesis of bidirectional texture functions on arbitrary surfaces", Computer Graphics Proceedings, Annual Conference Series, Jul. 2002.
Dana et al., "Reflectance and texture or real-world surfaces", ACM Transactions on Graphics, 18(1) :1-34, Jan. 1999.
Prusinkiewicz et al., "The artificial life of plants", SIGGRAPH 95 Course Notes, 7:1-38, 1995.
Liu et al., "Synthesizing bidirectional texture functions for real-world surfaces", Computer Graphics Proceedings, Annual Conference Series, pp. 97-106, Aug. 2001.

(Continued)

*Primary Examiner*—Matthew C. Bella
*Assistant Examiner*—Wesner Sajous
(74) *Attorney, Agent, or Firm*—Todd R. Fronek; Westman, Champlin & Kelly

(57) ABSTRACT

The present invention provides a systematic method for rendering feathers. In one aspect, a segment of a rachis having a first barb and second barb is generated. The first barb is generated based on a first barb length and the second barb is generated based on a second barb length.

28 Claims, 11 Drawing Sheets

OTHER PUBLICATIONS

Praun et al., "Lapped textures", Proceedings of SIGGRAPH 2000, pp. 465-470, Jul. 2000.

Koenderink et al., "Illuminance texture due to surface mesostructure", Journal of the Optical Society of America, 13(3):452-463, 1996.

Reynolds, "Flocks, herds and schools: A distributed behavioral model", Computer Graphics Proceedings (Proceedings of SIGGRAPH 87), vol. 21, pp. 25-34, Calf. Jul. 1987.

Franco et al., "Modeling the structure of feathers", In Proceedings of SIBGRAPI 2001-XIV Brazilian Symposium on Computer Graphics and Image Processing, p. 381, Oct. 2001.

J.T. Kajiya, "Rendering fur with three dimensional textures", Proceedings of the 16th annual conference on Computer graphics and interactive techniques, p. 27 1-280, Jul. 1989.

* cited by examiner

US 7,042,456 B2

MODELING AND RENDERING OF REALISTIC FEATHERS

BACKGROUND OF THE INVENTION

The present invention relates to computer generated graphics, in particular, the modeling and rendering of feathers using a computer.

Computer graphics are used in many different applications including computer games, movies and web pages. Graphically modeling and rendering of feathers for a realistic simulation of birds and other feather objects is a difficult task. In general, graphical feathers are generated on an ad hoc basis that consumes a significant amount of an artist's time to study and draw feathers. Thus, a systematic method for rendering feathers is useful.

SUMMARY OF THE INVENTION

The present invention provides a systematic method for rendering feathers. In one aspect, a segment of a rachis having a first barb and second barb is generated. The first barb is generated based on a first barb length and the second barb is generated based on a second barb length. In a further embodiment, the first barb and second barb can be randomly rotated to simulate an external force.

In a further aspect, a rachis and a plurality of barb line curves are generated. The barb line curves extend from and along at least a portion of the rachis. A textured surface is provided along the plurality of barb line curves. A sample feather can be used to provide texturing and color.

Additionally, another aspect of the invention relates to a method including defining a rachis curve, a left outline curve and a right outline curve. Left barbs are generated from the rachis curve to the left outline curve and right barbs are generated from the rachis curve to the right outline curve.

A computer interface is also provided that includes a rachis input module, a barb input module and an outline input module. The input modules are provided to selectively change a rachis curve, a barb curve and an outline curve. In a further embodiment, windows are provided to illustrate the rachis curve, the barb curve and the outline curve.

DETAILED DESCRIPTION OF ILLUSTRATIVE EMBODIMENTS

Figure 1:
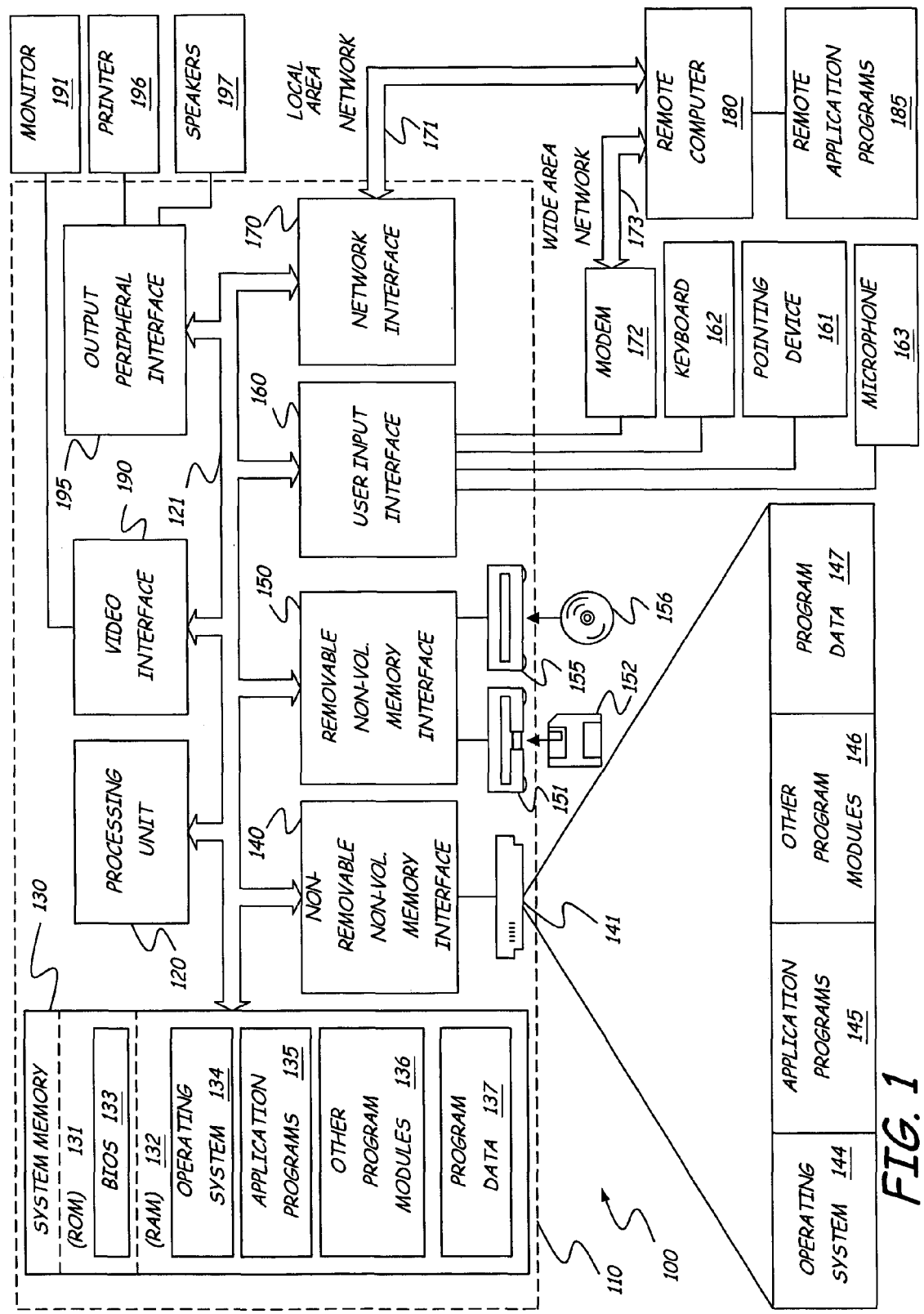
FIG. 1 illustrates a general computing environment.

Prior to discussing the present invention in greater detail, an embodiment of an illustrative environment in which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
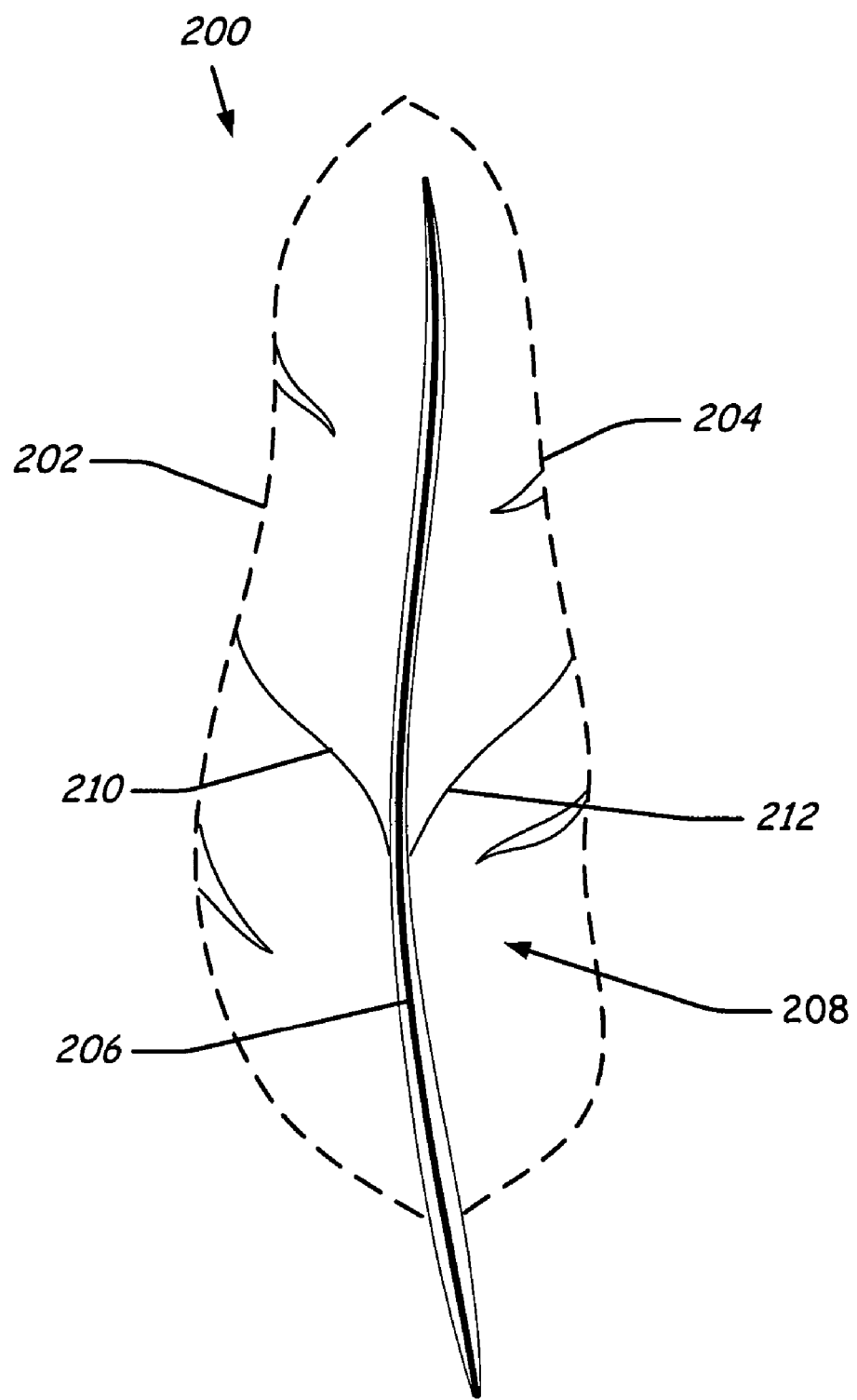
FIG. 2 illustrates an exemplary feather.

In order to gain a better understanding of the present invention, an exemplary feather is illustrated in FIG. 2. Feather 200 is defined by a left outline curve 202 and a right outline curve 204. Additionally, feather 200 includes a rachis 206 and a plurality of barbs 208, for example a left barb 210 and a right barb 212. The geometry of feather 200 is defined by its rachis and the barbs distributed along both sides of the rachis. Vanes on both sides of rachis 206 carry the plurality of barbs. Each barb includes a series of barbules, which are projections off of the barbs.

Figure 3:
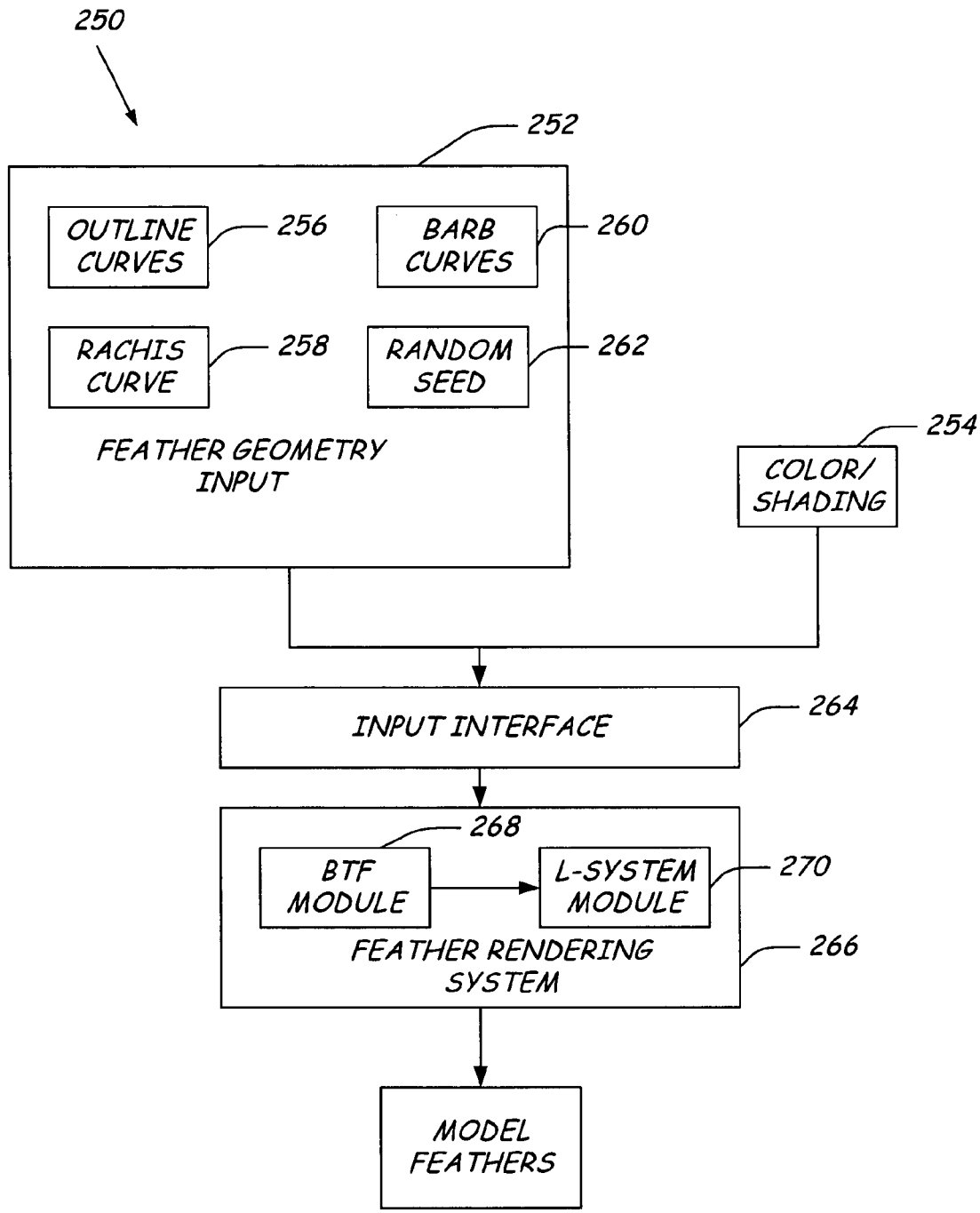
FIG. 3 illustrates a block diagram of an exemplary framework for a system.

FIG. 3 illustrates a block diagram of an exemplary framework for a system 250 in accordance with an embodiment of the present invention. In system 250, several inputs are provided by a user in order for system 250 to model feathers. In order to model individual feathers, geometry input 252 and texture image input 254 are provided to system 250. Input 252 includes various parameters defining a geometric shape of the feather. The parameters of input 252 can include outline curves 256, rachis curve 258, barb curves 260 and random seed 262. Texture image input 254 is used to define the texture and color of the feather. Inputs 252 and 254 are provided to an interface 264. Interface 264 provides an interactive interface for a user to selectively alter inputs 252 and 254. Additionally, interface 264 provides inputs 252 and 254 to a feather rendering system 266. To render individual feathers, system 266 includes a bi-directional texture function (BTF) module 268 and a parametric L-system module

270. The L-system module 270 is coupled to BTF module 268 in order to output and render synthetic feathers.

Figure 4:
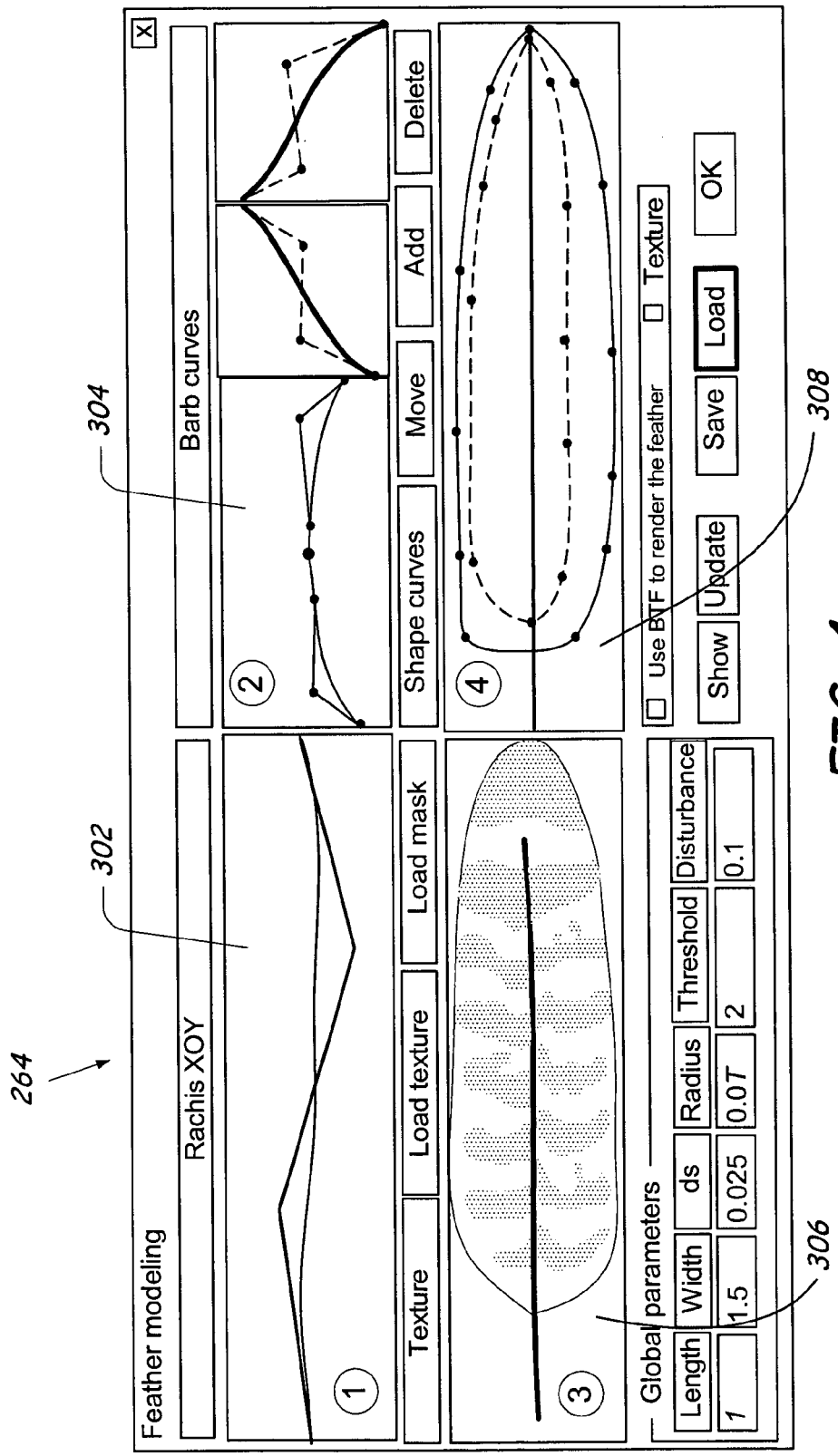
FIG. 4 illustrates an exemplary user interface for modeling and rendering of individual feathers.

FIG. 4 illustrates an exemplary user interface 264 for modeling and rendering of individual feathers. The interface includes a rachis window 302 that defines the rachis curve of the feather. A barb window 304 illustrates barb curves with views from a perspective parallel with the rachis curve and perpendicular with the rachis curve. Window 306 is a sample feather texture image that has been input by a user. For example, a user may scan in or otherwise provide a sample feather that is to be modeled and rendered by system 266. Additionally, window 308 illustrates outline curves of the feather. Each of the rachis curve in window 302, the barb curves in window 304 and outline curves in window 308 may be interactively changed by a user in order to control the overall shape of the feather. Once these curves have been defined, system 266 is able to render individual feathers.

System 266 uses L-system module 270 to produce a base structure for the feathers. A feather can be regarded as a branching structure composed of repeated units called modules. An L-system represents the development of a branching structure by productions. A production replaces a predecessor module by several successor modules. A production can either be context-free and depend only on the module replaced, or be context-sensitive, in which case the production depends on the replaced modules as well as its immediate neighbor modules. Context-free productions can be of the form:

id: pred: cond→succ where id is the production label, and whereas pred, cond and succ are the predecessor, condition, and successor, respectively. The production is carried out only if the condition is met.

Figure 5:
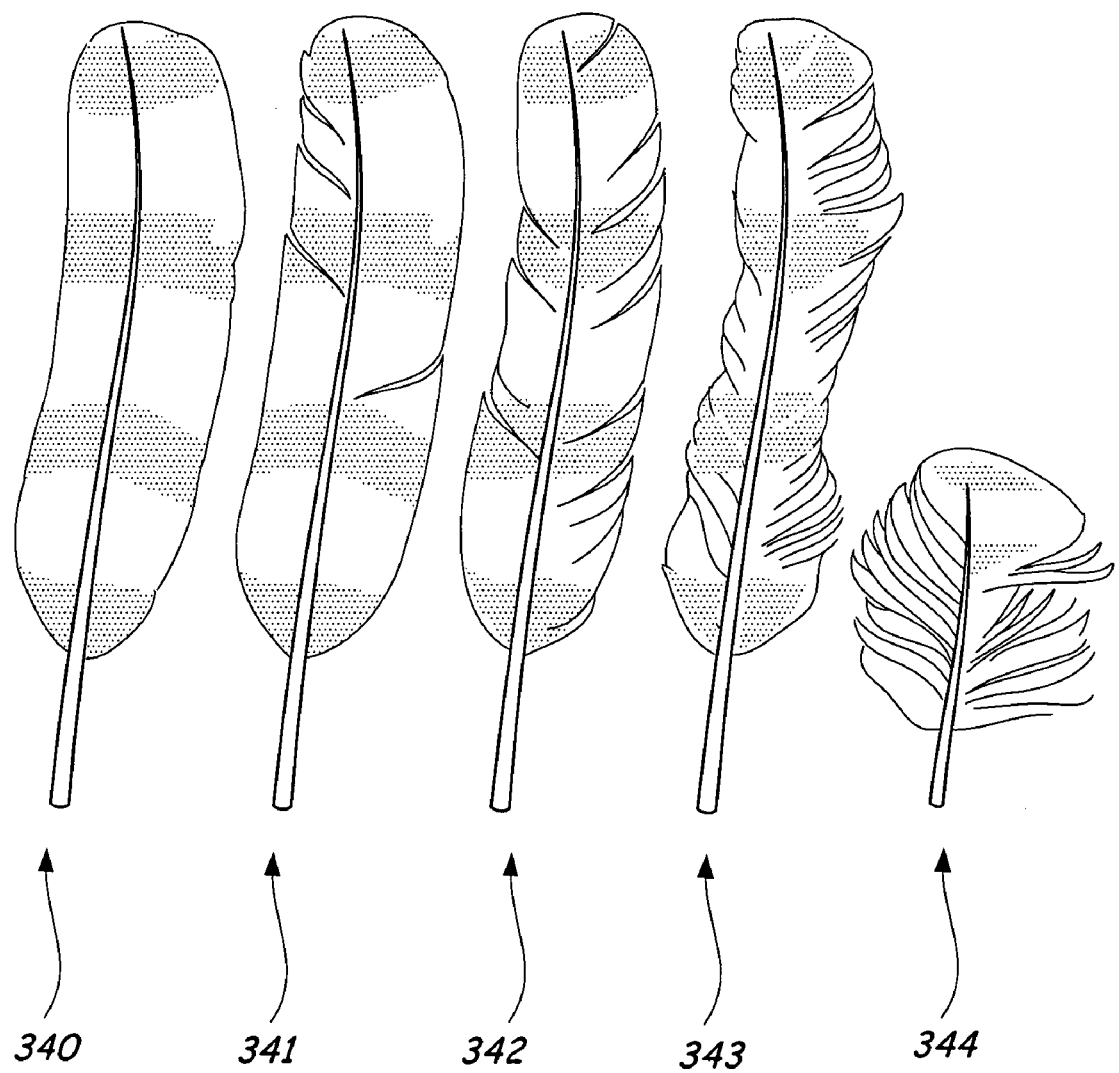
FIG. 5 illustrates example feathers rendered using the system illustrated in FIG. 3.

Given the rachis, barb, and outline curves as entered using interface 264, feather geometry can be modeled using a parametric L-system as follows:

$$\omega: R(0)$$

$$p_1: R(i): i<N \to [B_L(i,0)][B_R(i,0)]R(i+1)$$

$$p_2: B_L(i,j): j<M_L \to B_L(i,j+1)$$

$$p_3: B_R(i,j): j<M_R \to B_R(i,j+1) \quad (1)$$

where N defines the length of the feather as well as the density of the barbs at each side of the rachis while $M_L$ and $M_R$ define the lengths of the left and right barbs respectively. The axiom R(0) generates a feather based on the rachis and barb curves. Production $p_1$ produces a small segment of the rachis according to the rachis curve and grows a barb on each side of the rachis using recursion. Production $p_2$ creates a small segment of the left barb according to the left barb curve while production $p_3$ proceeds similarly on the right barb with a right barb curve. Feather 340 in FIG. 5 shows a feather created using the above equation.

However, equation (1) above ignores the interaction between neighboring barbs and thus feathers appear unnatural. A feather geometry generated by equation (1) looks plausible but too regular. For a real feather, two lateral sets of barbs within the vane of the feather interlock the feather together. The interlocking is important for flight, keeping the air from rushing right through the feather. When the interlocking system of a feather is disturbed, as when a twig brushes through a feather, random gaps form between the barbs on the same side of the rachis.

Neighboring barbs cling to each other by little hooks called cilium on the ends of the barbules if the total external force exceeds the holding capabilities of the cilium. To simulate this effect, external forces are introduced into our parametric L-system based on random seed parameter 262 as follows:

$$\omega: R(0,0,0) \quad (2)$$

$$p_1: R(i, F_L, F_R): i<N \,\&\&\, F_L<F_0 \,\&\&\, F_R \le F_0 \to [B_L(i,0)]$$

$$[B_R(i,0)]R(i+1, F_L+F_e, F_R+F_e)$$

$$p_2: R(i, F_L, F_R): i<N \,\&\&\, F_L>F_0 \,\&\&$$

$$F_R \le F_0 \to [O_L B_L(i,0)][B_R(i,0)]R(i+1,0,F_R+F_e)$$

$$p_3: R(i, F_L, F_R): i<N \,\&\&\, F_L \le F_0 \,\&\&\, F_R \le F_0 \to [B_L(i,0)]$$

$$[O_R B_R(i,0)]R(i+1, F_L+F_e, 0)$$

$$p_4: R(i, F_L, F_R): i<N \,\&\&\, F_L>F_0 \,\&\&$$

$$F_R>F_0 \to [O_L B_L(i,0)][O_R B_R(i,0)]R(i+1,0,0)$$

$$p_5: B_L(i,j): j<M_L \to B_L(i,j+1)$$

$$p_6: B_R(i,j): j<M_R \to B_R(i,j+1)$$

where $F_L$ and $F_R$ are the total external forces on the left and right barbs respectively. $O_L$ and $O_R$ are directional rotations of the left and right barbs in response to $F_L$ and $F_R$. The productions $p_1$ and $p_4$ produce a portion of the feather that, for each step along the rachis curve, $F_L$ and $F_R$ exceeds a threshold force $F_0$ exerted by the cilium, the left (right) barb is rotated by a random angle θ in a direction determined by $F_L$ ($F_R$). The rotation of the barb is assumed to be within the tangent plane defined by the tangent vectors of the rachis and barb at the point where the rachis and barb intersect. The random rotation angle is computed as $\theta=\lambda r_k(s)$ where $r_k(s)$ is the k-th random number generated with random seed and can be a user-defined constant. After the rotation $F_L(F_R)$ starts to accumulate again from zero. The random seed of each feather can be saved so that its shape remains the same every time it is rendered. FIG. 5 contains a number of feathers 341-344 created with random gaps between the barbs. The different feathers 341-344 are rendered by changing various feathers geometry parameters.

Equation (2) provides a feather structure including random gaps. Adding texture and color to the structure provides realistic rendering of the feathers. In order to provide texture to the feature structure, BTF module 268 captures the mesostructure and the directional radiance distribution at each point on the feather surface. A BTF is a 6D function $T(x, y, \theta_v, \phi_v, \theta_1, \phi_1)$, where $(\theta_v, \phi_v)$ is the viewing direction v and $(\theta_1, \phi_1)$ is the lighting direction 1 at surface point (x, y). The BTF defines variation in pixel intensity based on a number of parameters.

Figure 6:
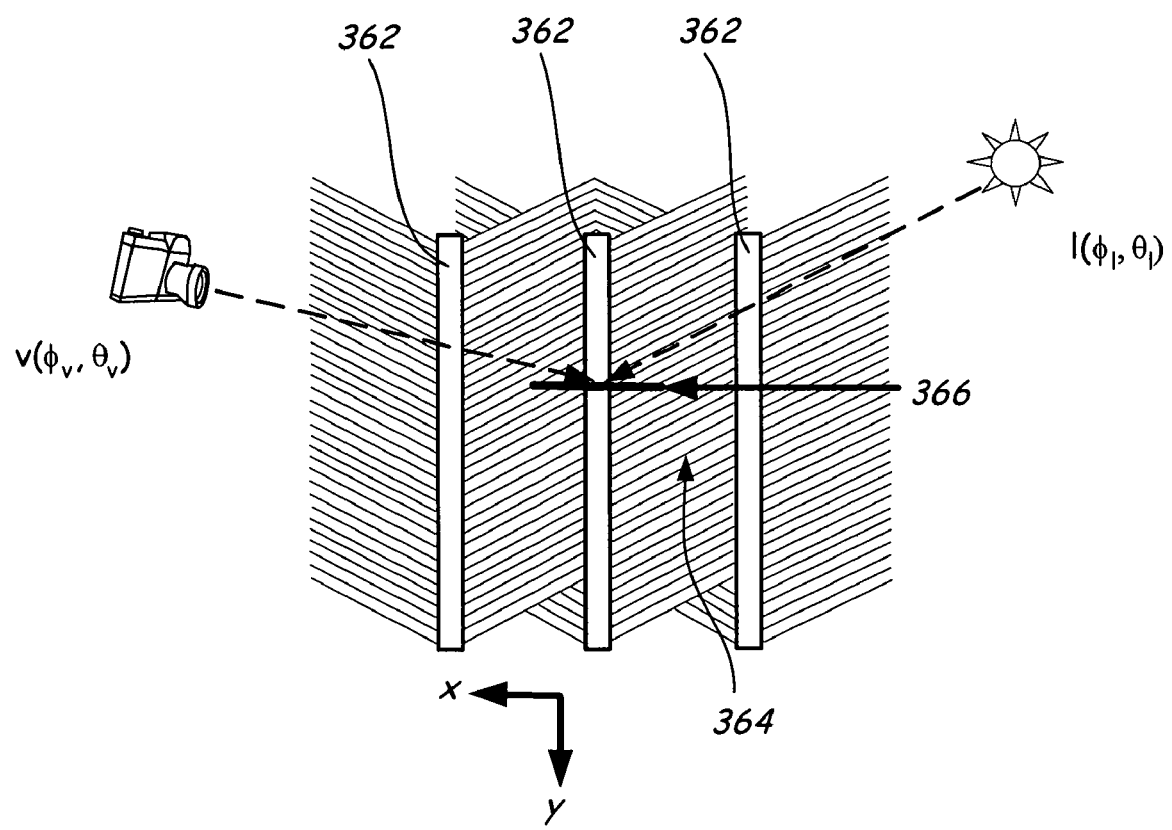
FIG. 6 is a schematic model of a feather for sampling a feather texture.

To calculate the BTF, a geometry model is built for the barbs and barbules as shown in FIG. 6 according to the structure of the barbs and barbules. FIG. 6 illustrates a schematic model 360 of three barbs 362 and a plurality of barbules 364 projecting from the barbs 362. This structure is rendered for all viewing and lighting settings. In one embodiment, the rendering is done offline so that a complicated geometry and sophisticated lighting models can be used. This model is opaque with both diffuse and specular reflections.

A sample line 366 of the BTF can be taken along an axis perpendicular to the barbs 362 to obtain a 5D BTF $T_{BB}(x, \theta_v,$ $\phi_v$, $\theta_1$, $\phi_1$) for some constant $y_0$. A 5D BTU suffices for rendering the actual 6D BTU of a feather because of the spatial arrangement of barbs and barbules. The mesostructure of barbs and barbules is rendered such that fine-scale shadows, occlusions, and specularities are well-captured in the BTU $T_{BB}$. The rendering can be done offline by using a ray-tracer.

The above model of feather mesostructure has a number of advantages. First, the off-line BTU calculations allow capturing of a complicated mesostructure and directional radiance distribution at each surface point. Second, the BTU can model additional effects such as oil-film interference and iridescence, which is important for a class of familiar birds such as hummingbirds and ducks. Finally, a level-of-detail rendering can easily be supported with a BTU. As a result, the feather mesostructure can easily be simulated.

When rendering a feather, parametric L-system module 270 generates the feather at run-time. By generating the feather at run-time, the storage requirement is modest for each feather because only its L-system parameters and the random seeds are stored; details such as barb curves (polylines) and the random gaps on the vane (the feather blade) are generated at run-time. After the feather structure is rendered using L-system module 270, BTU module 268 is used to efficiently draw the barb-barbule mesostructure on the feather structure and thus achieve realistic rendering for a wide range of viewing distances.

Figure 7:
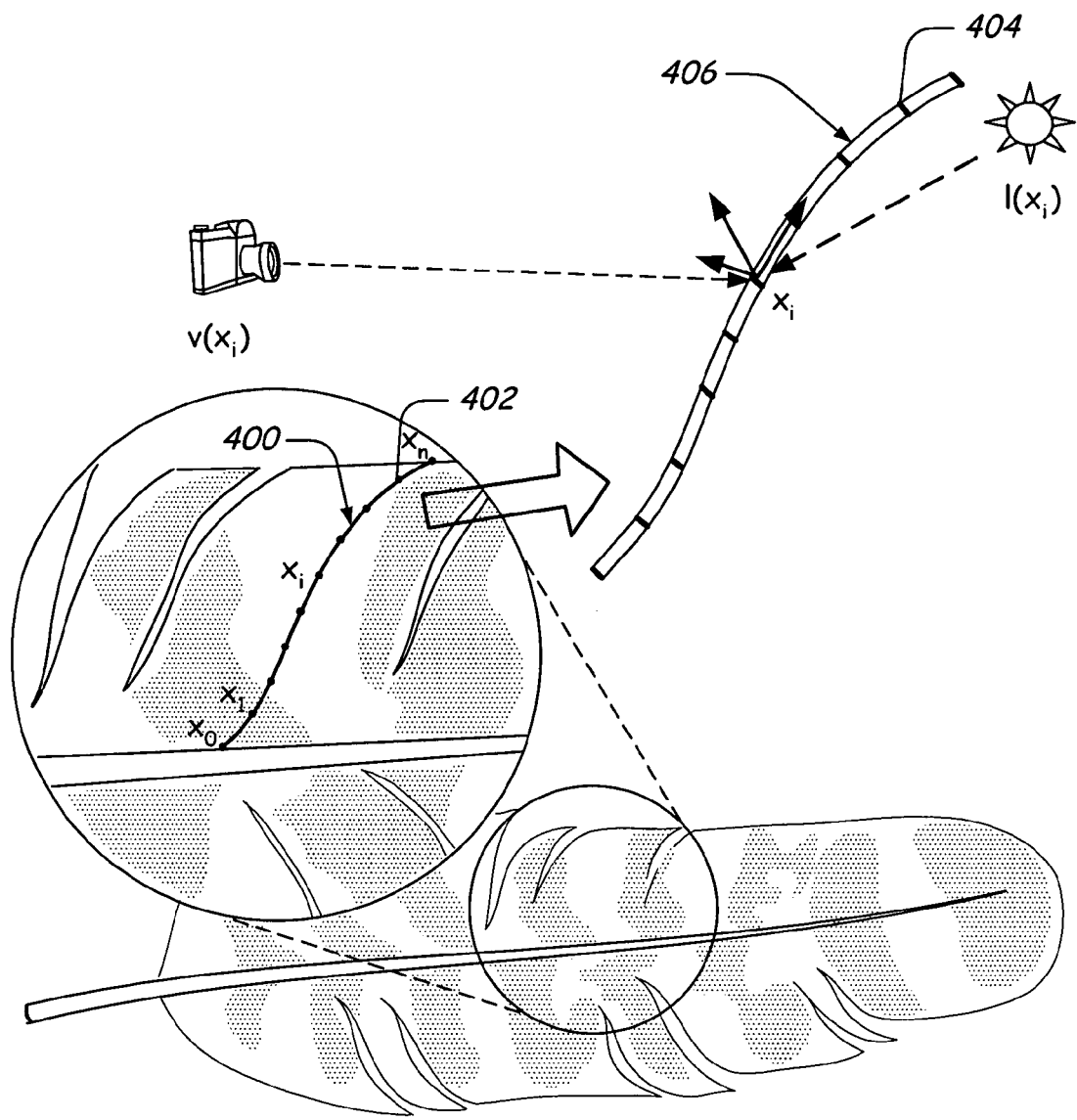
FIG. 7 illustrates rendering a feather according to an embodiment of the present invention.

FIG. 7 illustrates the rendering of a feather. The feather L-system describes a barb 400 by a polyline 402 with vertices $\{x_1, x_2, \ldots, x_n\}$. After polyline 402 is generated, texture is added by BTU module 268 to simulate the barb-barbule mesostructure. In one embodiment, a quadrilateral strip 404 including a plurality of polygons 406 is placed along the polyline 402 and the texture is added to each of the polygons 406. The local lighting direction l and viewing direction v are calculated at every vertex $x_i$ of polyline 402 using the local coordinate frame at $x_i$. At each segment edge across the barb polyline 402, a 1D texture is created by looking up color values from BTU module 268 generated using the feather texture image in window 306 using the directions $v(x_i)$ and $l(x_i)$. Thus, (n+1) 1D textures are obtained. These textures are combined with the texture of the feather in each of the polygons 406 to render the barb 400 by multi-texturing (application of several textures on the same object) and alpha-blending (altering of the transparency of an object), as is known in the art. When sampling the BTU with a ray tracer, parameters can be adjusted so that the BTU gives a "hard" or "soft" appearance to the feather. Furthermore, occlusions and specularities can be rendered as caused by the barb mesostructure.

Figure 8:
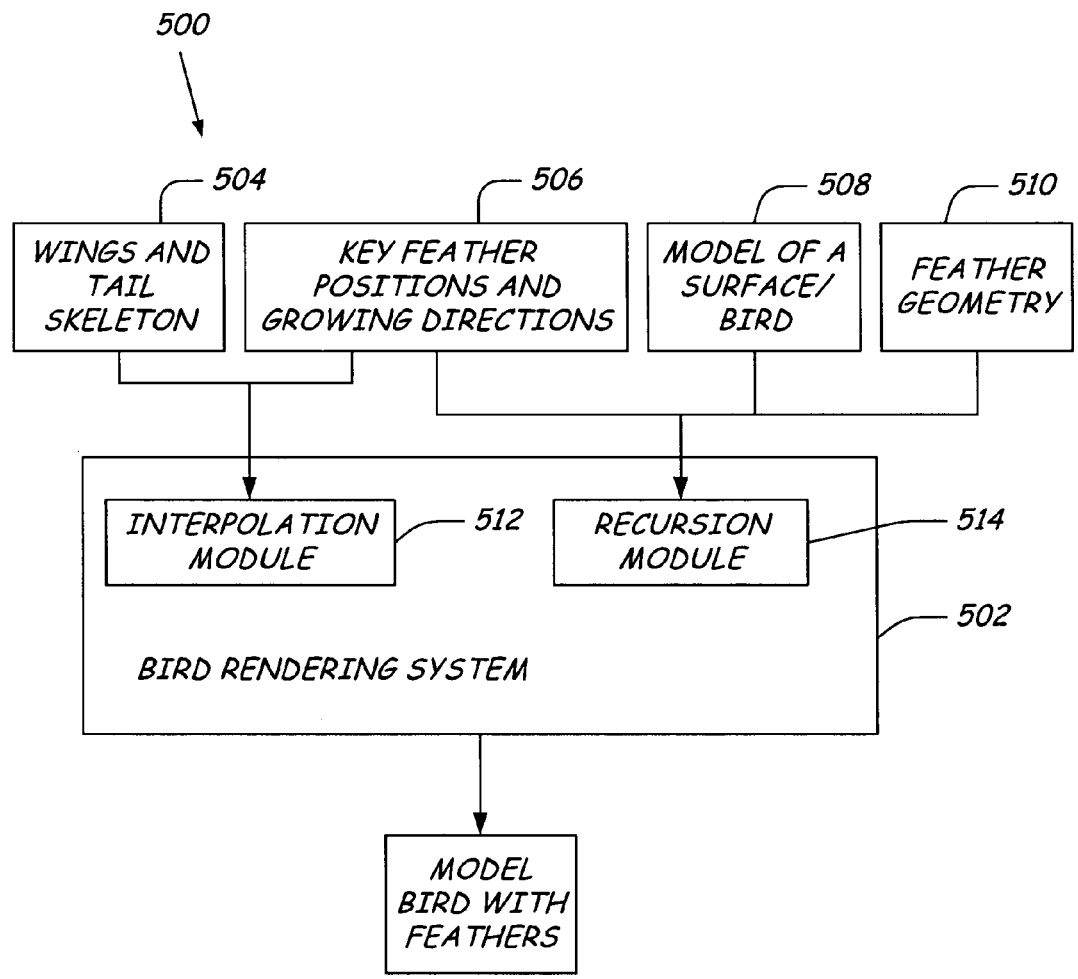
FIG. 8 illustrates an exemplary framework for placing feathers on a surface.

Once individual feathers have been rendered, the feathers can be placed on a surface. FIG. 8 illustrates a framework 500 for placing feathers on a surface such as a bird. In framework 500, several inputs are provided to a bird rendering system 502 in order to output a model bird having feathers. The inputs include wings and tail skeletons 504, key feather positions and growing directions 506, a model of a surface or bird 508 and feather geometry 510. Using wings and tail skeletons 504, a user will place key feathers and orient growing directions of the feathers on the wings and tail skeletons. As described below, the wings and tail skeletons 504 and the key feather positions and growing directions on the wings and tail skeletons are provided to an interpolation module 512 within bird rendering system 502.

In order to place contour feathers, key feather positions and growing directions are provided on the model of a surface or bird 508. Inputs 506, 508, as well as the feather geometry 510 are provided to a recursion module 514. As discussed below, recursion module 514 automatically places feathers onto a surface given the feather geometry 510 in order to detect and correct collisions between adjacent feathers.

Figure 9:
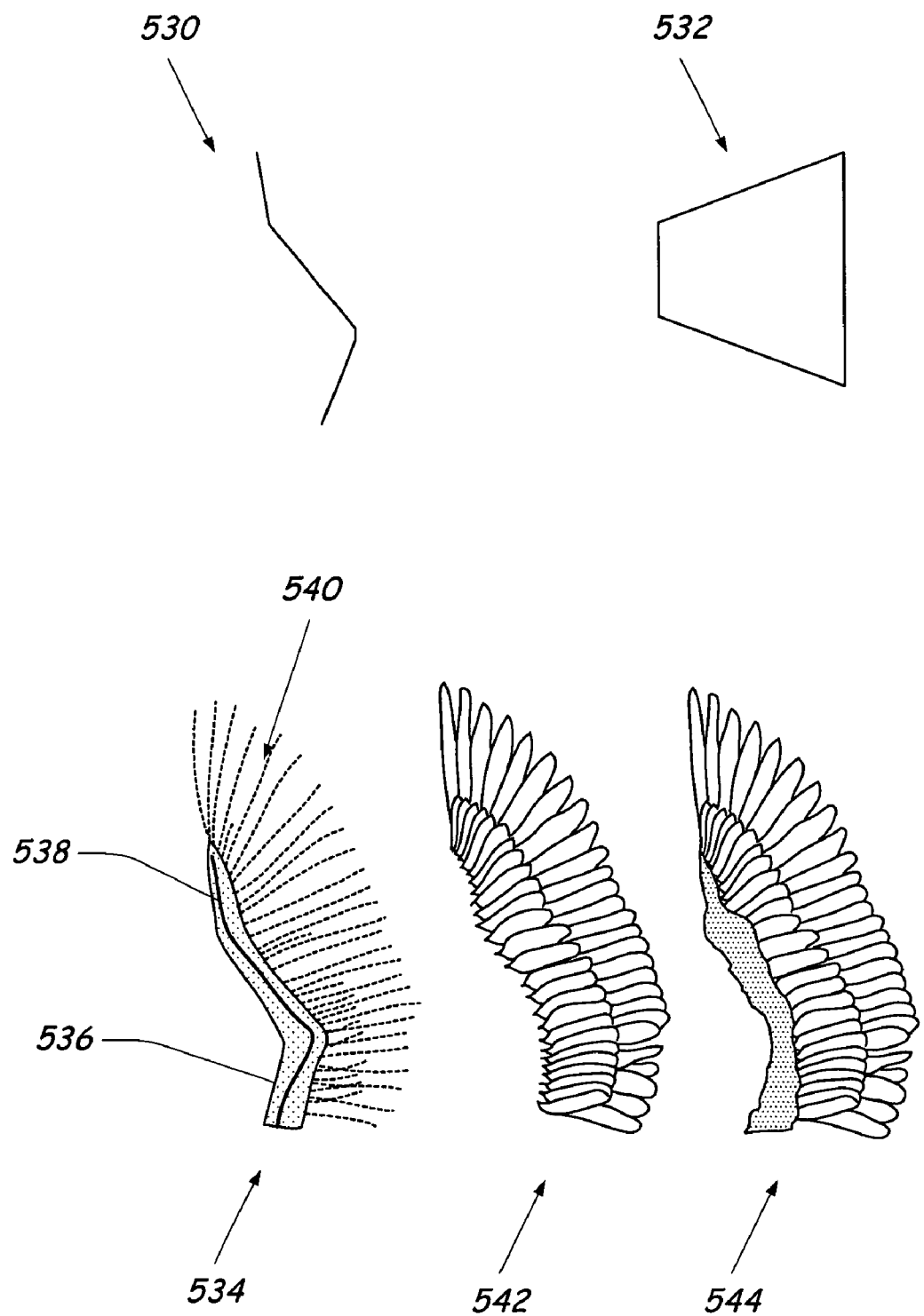
FIG. 9 illustrates placing feathers on a wing and a tail skeleton.

Feathers are placed on the wings and the tail using skeletons 504 and key feather positions and growing directions 506. The feathers on a wing include the primaries, secondaries, humerals, primary coverts, and secondary coverts (these feathers are rooted on the scapula, ulna/radius, metacarpus and phalanx respectively). As shown in FIG. 9, a polyline 530 of line segments is used to represent the wing skeleton. Similarly a quadrilateral 532 is used as the skeleton for the tail. A bird has about 9 to 11 primaries, 6 to 24 secondaries, and 8 to 24 tail feathers. The user can specify the numbers of feathers of each type and edit key feathers on the wing and key feathers on the tail using polyline 530 and quadrilateral 532. Interpolation module 512, using polyline 530 and quadrilateral 532, generates other feathers by interpolation.

FIG. 9 further illustrates placement of feathers on a wing. A model 534 includes a polyline 536, a surface model 538 and a plurality of segments 540 indicating where on polyline 536 feathers are to be placed. Model 542 illustrates the placement of the feathers on the polyline 536 and model 544 illustrates small wing features placed on surface model 538.

Contour feathers are the feathers that cover the body of a bird. Given a polygonal model 508 describing a bird's body (without feathers), feathers of different sizes and shapes are placed on the model. The large number of feathers on a bird makes it difficult to manually place and edit individual feathers. A user can specify a number of key feathers and their growing directions using input 506 and system 502 the system automatically generates a full coverage of the bird based on the key feathers using recursion module 514. This full coverage is performed by recursion module 514 in three steps:

a) re-tile the polygonal model 508 to generate feather growing positions, b) interpolate the key feather growing directions to all feather growing points to get an initial growing direction at each point, and c) recursively determine the final feather growing direction at every feather growing point, with collisions between feathers detected and rectified.

The output of recursion module 514 is a feather placement map indicating feather growing positions and directions. The feather shape parameters (i.e. outline curves 256, rachis curve 258 and barb curves 260) can be estimated from that of nearby key feathers or provided with model feather input 510. These shape parameters are used to generate a simplified geometry for each feather. This simplified geometry is used for collision detection in step (c) above.

The vertices of the given polygonal model 508 are difficult to use as feather growing positions. Feathers at different parts of a bird have different sizes, for example small feathers need to grow densely in order to cover the bird's skin. In addition, feathers tend to distribute evenly in a region of constant feather density. Vertices of a conventional polygonal model often do not have evenly distributed vertices or account for increased feather density in positions where the feathers are small. To address this problem the polygonal model 508 can be retiled using a suitable re-tiling algorithm as is known in the art. This re-tiling creates a polygonal model whose vertices are evenly distributed over a region of constant density.

A simple technique may also be used for adjusting vertex density based on curvature. This technique can be used to control vertex density based on the sizes of feathers. In one embodiment, the sizes from the key feathers are estimated using Gaussian radial basis functions, where a radius is defined as a distance over a surface, as computed using a shortest path algorithm. The user has control over the spatial extent and weight of each basis function. This estimation scheme is used for creating vector fields on a polygonal surface. Ultimately, vector fields for vertices are created for the polygonal model. After re-tiling, the vertices of the new polygonal model are the feather growing positions.

From the growing directions of key feathers, initial growing directions are calculated at all vertices using Gaussian radial basis functions as described above. The initial growing directions tend to cause inter-penetration of feathers because these directions are derived without any consideration to the shapes of the feathers. To determine the final growing directions, collision detection is performed on the feathers based on a simplified geometry and the feather growing directions are adjusted accordingly. Because of the large number of feathers and the complex shape of a bird's body, a collision detection between every pair of feathers is likely to be very expensive. To address this problem two strategies are adopted. First, feathers are grown in an orderly fashion according to the initial growing directions. Second, local collisions between neighboring feathers are only considered because collisions rarely happen between feathers far away from each other (two feathers are neighboring feathers if their growing positions are connected by an edge of a polygon). A recursive collision detection algorithm is used in recursion module 514 to implement these strategies.

As FIGS. 10A–10D illustrate, vertices around each vertex v are classified into two groups according to the initial growing direction $o_v$ for v. The first group includes vertices in the growing direction and the second group includes vertices not in the growing direction.

After the vertices around every vertex are classified, recursion module 514 invokes the following recursive collision detection algorithm at each vertex.

```
FindGrowingDirection(v)
{
    If the growing direction at v has already
        been found, return;
    For each vertex v' in the growing direction
        v, FindGrowingDirection(v');
    While feather(v) collides with feather(v')
        for some vertex in the growing
            direction, adjust the growing
            direction at v;
    For each vertex v' not in the growing
        direction, FindGrowingDirection(v');
}
```

Figure 10A:
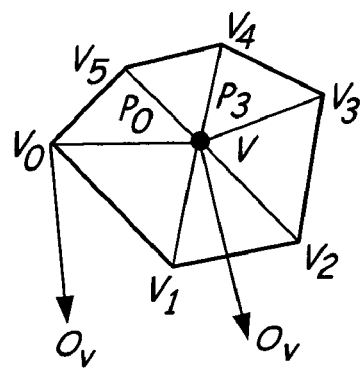
FIGS. 10A–10D illustrate placing feathers on a polygon of a surface.
Figure 10B:
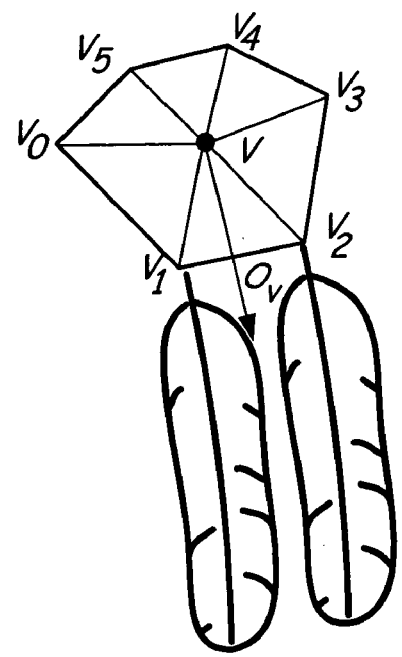
Figure 10C:
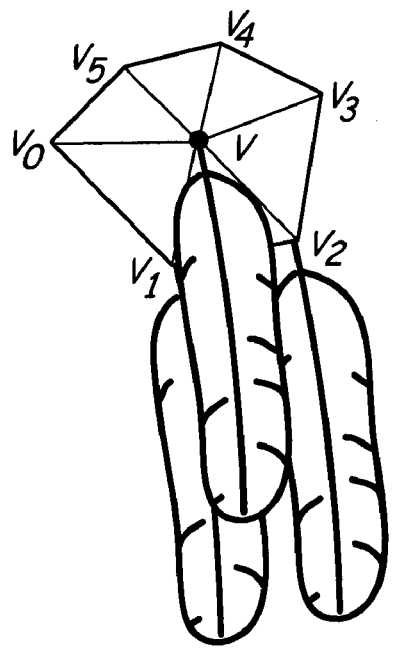
Figure 10D:
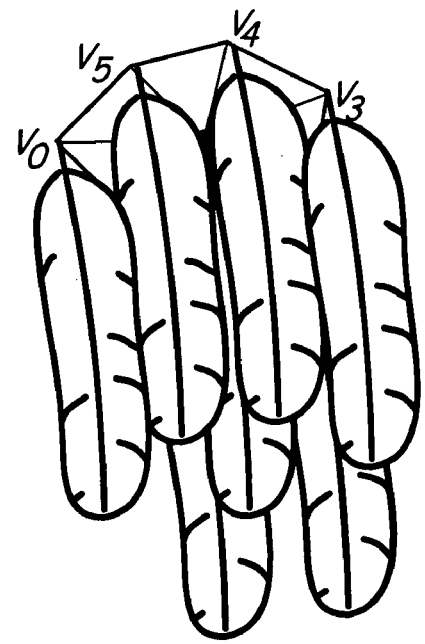

Here feather(v) and feather(v') are the feathers at vertices v and v', respectively. A vertex v on the re-tiled model 508 with initial growing direction $o_v$ is shown in FIG. 10A. The vertices around v are vertices $v_0$ through $v_5$. Among these, $v_1$ and $v_2$ are in the growing direction, whereas $v_3$, $v_4$ and $v_5$ are not in the growing direction. According to the algorithm above, the final growing directions at $v_1$ and $v_2$ is first determined by recursion as illustrated at FIG. 10B. Based on the final growing directions at $v_1$ and $v_2$ as well as the shapes of feathers at v, $v_1$ and $v_2$, collision between the feathers can be detected and the feather growing direction at v can be adjusted by rotating feather v toward the surface normal at v as shown at FIG. 10C. Rotation can be performed in small increments, so that rotation can stop as soon as there are no collisions detected. The growing direction at v is then final and the growing directions for $v_0$, $v_3$, $v_4$ and $v_5$ can be processed through using the recursion algorithm above as shown at FIG. 10D. For faster collision detection, a simplified geometry can be used for each feather.

Figure 11:
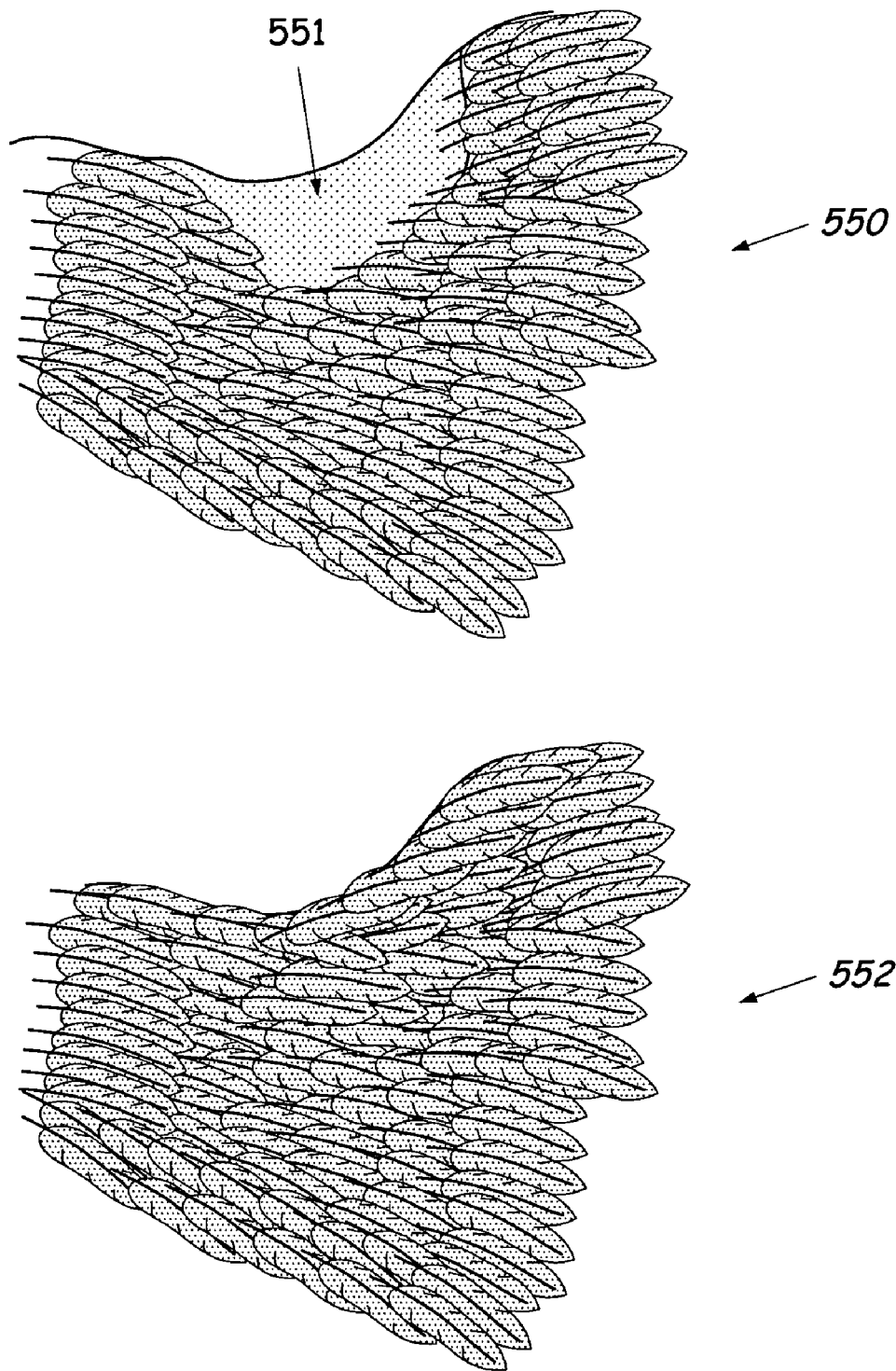
FIG. 11 illustrates a first bird and a second bird.

FIG. 11 illustrates a sample bird 550 having feathers placed according to initial growing directions and a sample bird 552 having feathers rendered according to the algorithm above. In sample bird 550, there are numerous inter-penetrating feathers and many feathers that grow inside the bird's skin as illustrated at 551. When using the recursion algorithm above with recursion module 514, sample bird 552 having a realistic rendering is achieved.

Although the present invention has been described with reference to particular embodiments, workers skilled in the art will recognize that changes may be made in form and detail without departing from the spirit and scope of the invention.

What is claimed is:

1. A computer implemented method for rendering a feather, comprising:
   generating a segment of a rachis having a first barb and a second barb;
   generating the first barb based on a first barb length;
   generating the second barb based on a second barb length; and
   randomly rotating the first barb curve to simulate an external force placed on the first barb.

2. The method of claim 1 wherein generating a segment is performed as a function of a rachis curve.

3. The method of claim 1 wherein generating a first barb is performed as a function of a first barb curve.

4. The method of claim 1 wherein generating a first barb further comprises generating a polyline having a number of barb segments.

5. The method of claim 4 and further comprising generating a number of polygons along the barb segments.

6. The method of claim 5 and further comprising texturing each of the polygons.

7. The method of claim 1 and further comprising receiving an input sample feather and wherein the segment of the rachis, the first barb and the second barb are generated based on the sample feather.

8. A computer implemented method for rendering a feather, comprising:
   generating a rachis;
   generating a plurality of barb line curves extending from and along at least a portion of the rachis;
   randomly rotating at least some of the plurality of barb line curves to simulate an external force placed on the at least some of the plurality of barb line curves; and
   providing a textured surface along the plurality of barb line curves.

9. The method of claim 8 and further comprising generating polygons along the plurality of barb line curves.

10. The method of claim 8 wherein providing a textured surface includes modeling a bi-directional texture function from a sample feather.

11. The method of claim 10 wherein modeling a bi-directional texture function includes modeling a structure of barbs and barbules of the sample feather.

12. The method of claim 8 and further comprising providing a left outline curve and a right outline curve, the left outline curve and right outline curve defining lengths of the barb line curves.

13. The method of claim 8 wherein providing a textured surface includes coloring the textured surface based on a sample feather.

14. A computer implemented method for rendering a feather, comprising:
   defining a rachis curve;
   defining a left outline curve and a right outline curve;
   generating left barbs from the rachis curve to the left outline curve;
   generating right barbs from the rachis curve to the right outline curve; and
   randomly rotating at least some of the left barbs and right barbs to simulate an external force placed on the at least some of the left barbs and right barbs.

15. The method of claim 14 wherein generating left barbs is performed as a function of a left barb curve.

16. The method of claim 14 wherein generating right barbs is performed as a function of a right barb curve.

17. The method of claim 14 wherein generating left barbs and generating right barbs further comprise generating polylines having a number of barb segments.

18. The method of claim 17 and further comprising generating polygons along the barb segments.

19. The method of claim 18 and further comprising texturing each of the polygons.

20. The method of claim 14 and further comprising receiving an input sample feather and wherein the rachis curve, the left outline curve, and the right outline curve are defined based on the sample feather.

21. A computer interface for generating feathers, comprising:
   a rachis input module to selectively change a rachis curve;
   a barb input module to selectively change a barb curve;
   a random input to randomly rotate barb curves to simulate an external force placed on the barb curves; and
   an outline input module to selectively change an outline curve.

22. The computer interface of claim 21 and further comprising a feather input module for inputting a sample feather.

23. The computer interface of claim 22 wherein the rachis input module generates the rachis curve based on the sample feather.

24. The computer interface of claim 22 wherein the barb input module generates the barb curve based on the sample feather.

25. The computer interface of claim 22 wherein the outline input module generates the outline curve based on the sample feather.

26. The computer interface of claim 21 wherein the rachis input module includes a window illustrating the rachis curve.

27. The computer interface of claim 21 wherein the barb input module includes a window illustrating the barb curve.

28. The computer interface of claim 21 wherein the outline input module includes a window illustrating the outline curve.

* * * * *